No. 782,912. PATENTED FEB. 21, 1905.
J. O. KING.
TIRE CASING.
APPLICATION FILED FEB. 23, 1904.

Witnesses:
Geo. W. Young.
R. J. Pasch.

Inventor:
John O. King
By H. G. Underwood
Attorneys

No. 782,912.

Patented February 21, 1905.

UNITED STATES PATENT OFFICE.

JOHN O. KING, OF RACINE, WISCONSIN, ASSIGNOR OF ONE-HALF TO THOMAS M. KEARNEY, WILLIAM D. THOMPSON, AND PETER J. MYERS, OF RACINE, WISCONSIN.

TIRE-CASING.

SPECIFICATION forming part of Letters Patent No. 782,912, dated February 21, 1905.

Application filed February 23, 1904. Serial No. 194,804.

*To all whom it may concern:*

Be it known that I, JOHN O. KING, a citizen of the United States, and a resident of Racine, in the county of Racine and State of Wisconsin, have invented certain new and useful Improvements in Tire-Casings; and I do hereby declare that the following is a full, clear, and exact description thereof.

My invention has especial reference to a casing for pneumatic tires, the same being of the general style known as "clenchers;" and it consists in certain peculiarities of construction and combination of parts, as will be fully set forth hereinafter in connection with the accompanying drawings and subsequently claimed.

Figure 1:
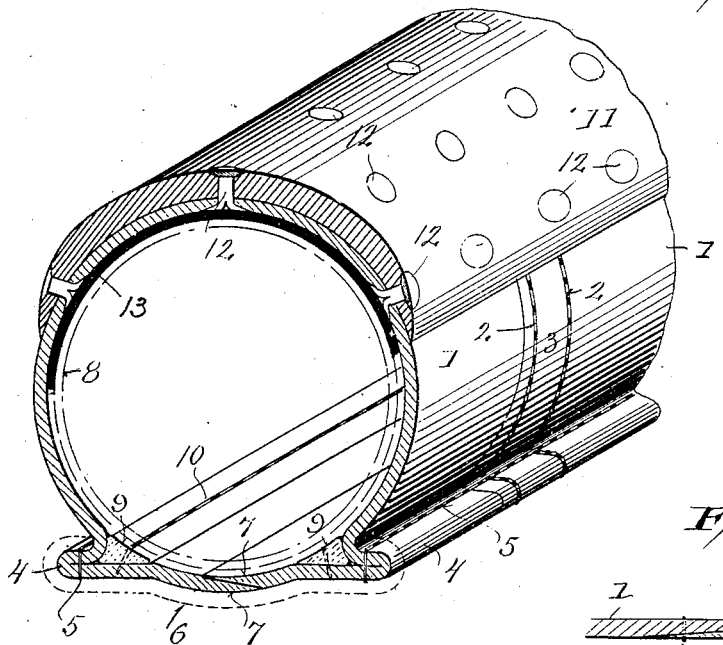
Figure 3:
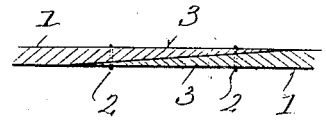
Figure 2:
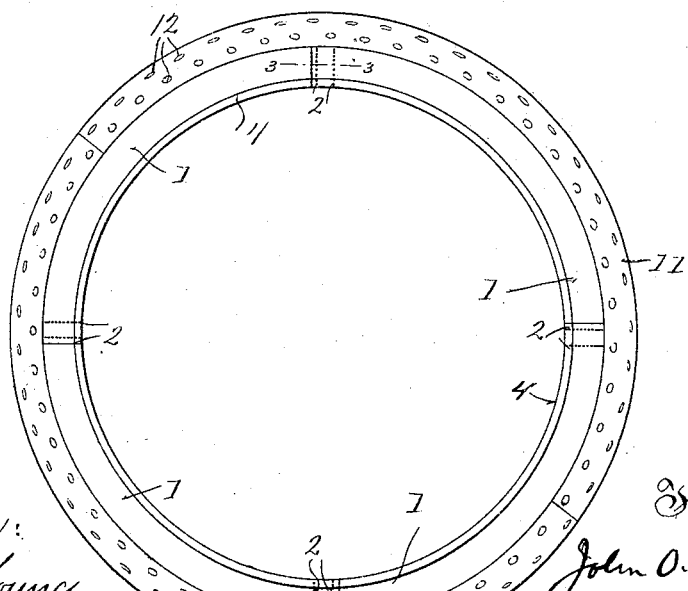

In the said drawings, Figure 1 is a perspective view and partly a sectional view of a portion of my said tire-casing. Fig. 2 is a view in side elevation of the entire tire-casing, drawn to a greatly-reduced scale. Fig. 3 is a detail view showing the lap of two parts of the casing, taken on the plane indicated by the line 3 3 in Fig. 2, but drawn to the same scale as Fig. 1.

Referring by numerals to the drawings, 1 1 represent the sections of which my tire-casing is formed, four of such being here shown, but the exact number being immaterial. These sections are made of any suitable flexible leather, the edges of each two adjacent sections being skived, as shown at 3 3 in Fig. 3, and when put together secured by lines of stitching 2 2, so that the uniformity of the surface of these leather sections is not disturbed, both the inner and outer surfaces being at all points smooth and the leather sections everywhere of equal thickness.

The casing adjacent to its inner periphery is doubled at each edge, as shown at 4 4, the thus doubled parts being held together by rows of stitching 5 5 to form the projecting edges whereby the said tire-casing is held to the clencher-rim, the latter being indicated by dotted outline at 6 in Fig. 1, and beyond these folded edges 4 4 the leather of the casing is continued from each side to about the center, where the edges are skived and overlapped, as shown at 7 7, but are not fastened together, being left open for the admission of the pneumatic tire or tube, (indicated by the dotted circle marked 8 in Fig. 1,) which when inflated fills the said tire-casing and keeps same firmly locked in proper position on and in the rim.

In order to insure a rounded interior surface to the casing and prevent the inflated tire or tube from being forced against the inner angle of the doubled edges 4 4, which would soon destroy or greatly injure the said inflated tire or tube, these angular spaces are filled up by the annular leather strips 9 of an approximately triangular shape in cross-section, and these strips are secured to the tire-sections 1, as by the lines of stitching 10.

The tread of my tire-casing is formed of a continuous strip or successive strips of sole-leather, (marked 11,) secured in any suitable way to the outer circumference of the casing, but preferably by the split rivets 12 12, as shown, as these not only secure the casing and its tread firmly together, but greatly aid in making the latter puncture-proof.

My tire-casing by being made all of leather is much more durable than one made of rubber or rubber-and-fabric compounds, and if it ever becomes necessary to repair same this can be more readily, cheaply, and successfully done than with rubber casings, and I produce an altogether better and stronger device particularly adapted for use with automobiles and in heavy teaming.

If desired, my casing when completed as herein described may be lined with any suitable fabric, secured by rubber cement to the inner surface of said casing, as indicated at 13, the said lining extending continuously to the inner edges of the central annular opening, and hence covering up the described filling-strips 9, but not interfering with opening of the casing when the pneumatic tire or tube 8 is to be inserted or removed.

The leather of the sections 1 1 may be waterproofed in any preferred manner either before the completion of the casing or afterward.

Having thus described my invention, what I claim as new, and desire to secure by Letters Patent, is—

A tire-casing, comprising sections of flexible leather stitched together to form a continuous annular tube open at its inner circumference, and with the meeting edges there, and at the junction of each two sections skived to insure uniformity of surface and thickness at all points of union, and with the leather of the sections folded and stitched together on each side of the line of the annular opening, in combination with annular angular strips filling the angular spaces back of the said folded portions, and rows of stitching uniting said strips to said casing.

In testimony that I claim the foregoing I have hereunto set my hand, at Milwaukee, in the county of Milwaukee and State of Wisconsin, in the presence of two witnesses.

JOHN O. KING.

Witnesses:
H. G. UNDERWOOD,
R. J. BARSCH.